2,922,784
N-ALKYL-N-SORBITYLUREAS

Fred E. Boettner, Philadelphia, Pa., assignor to Rohm & Haas Company, Philadelphia, Pa., a corporation of Delaware No Drawing. Application February 27, 1958
Serial No. 717,844

5 Claims. (Cl. 260—211)

This invention deals with N-alkyl-N-sorbitylureas as new compositions of matter.

The present compounds are made by reacting an N-alkylglucamine and an alkali metal cyanate, preferably potassium cyanate, in the presence of a strong, non-oxidizing mineral acid, such as hydrochloric, hydrobromic, sulfuric and phosphoric acids, and the like, to form an N-alkyl-N-sorbitylurea, in which the alkyl group contains 8 to 14 carbon atoms.

Typical alkyl groups that may be employed are octyl, isooctyl, tert-octyl, decyl, isodecyl, tert-decyl, undecyl, dodecyl, tert-dodecyl, tridecyl, tetradecyl, tert-tetradecyl, and the like.

It is preferred to use potassium cyanate as the alkali metal cyanate reactant. Although other alkali metal cyanates may be used in the present reaction, such as sodium cyanate, best results are obtained by using potassium cyanate, and, therefore, such is preferred.

It is necessary in order to effect the present reaction between an N-alkylglucamine and an alkali metal cyanate to have present a strong, non-oxidizing mineral acid. Suitable for this use are hydrochloric, hydrobromic, sulfuric, and phosphoric acids, among others. Hydrochloric acid appears to be particularly well suited to this use. The acid should preferably be present in equimolar amounts with the alkali metal cyanate for best results. Apparently a reaction occurs between the cyanate and the acid in which cyanic acid is formed. Cyanic acid then reacts with the amine part of the N-alkylglucamine molecule to form the products of this invention. Actually, cyanic acid itself reacts with N-alkylglucamine to form the desired products, but since cyanic acid is expensive and difficult to obtain and use, it is preferred to conduct the reaction as described above.

It is preferable to conduct the instant reaction in the presence of an inert, volatile aqueous solvent in order to maintain the reactants in a state of intimate chemical proximity and to achieve maximum heat transfer benefits. Water is the preferred solvent, although aqueous alcohols are quite satisfactory.

The reaction temperature is not especially critical. The reaction proceeds quite readily in the range of 10° C. to the reflux temperature of the reaction mixture. Actually the reaction occurs below 10° C. but at a very slow rate, and as the temperature approaches the freezing point of water, the reaction occurs inappreciably, if at all.

The reactants of this invention react in equimolecular proportions to form the N-alkyl-N-sorbitylureas. It is somewhat preferable to have present in the reaction mixture a slight excess of the alkali metal cyanate and the mineral acid. This is done to assure maximum yields from the N-alkylglucamine. The excesses of the reactants are easily removed at the conclusion of the reaction. At the conclusion of the reaction, the reaction mixture is cooled in an ice bath to induce separation of the product from the water layer. The product is usually isolated by filtration.

The products of the instant invention, the N-alkyl-N-sorbitylureas, are frequently light colored or white, crystalline compounds. Many of these compounds resemble glass in appearance. These compounds are quite useful for many applications in the paper industry, being particularly well suited as rewetting agents on wet-strength papers. The present compounds impart to wet-strength papers the desirable properties of enhanced absorptivity and adsorptivity so that they are very effective in uses where water should be absorbed or adsorbed readily. An outstanding application in this respect is with paper towels wherein the present compounds impart unusually good properties of absorptivity and adsorptivity. Other N-alkyl-N-sorbitylureas, outside of the present range, are totally unsuited for such use because of either lack of surface activity or the presence of undesired solubility characteristics. For instance, compounds similar to those of the present invention, wherein the alkyl group is smaller than that required in the present invention, do not have any appreciable tendency to impart to wet-strength papers, the desired properties previously referred to. Compounds somewhat similar to the present products, wherein the alkyl groups are larger, have undesirable solubility characteristics that render them ineffective for the present purposes. Furthermore, prior art compounds, wherein there are N-alkyl groups of small size, including monohydroxy alkyl groups, are unsatisfactory for the present purposes in that they do not impart to wet-strength papers the desired characteristics of absorptivity and adsorptivity. In addition, the prior art compounds are structurally distinct in that there is no contemplation of a sorbityl or similar group.

This application is a continuation-in-part of my application Serial No. 451,049, filed August 19, 1954, now abandoned.

The N-alkyl-N-sorbitylureas are prepared in accordance with this invention as shown in the following illustrative examples in which parts by weight are used throughout.

Example 1

There were added to a reaction vessel 293 parts of N-octylglucamine, 90 parts of potassium cyanate, and 300 parts of water. The mixture was warmed slightly and then there was slowly added 275 parts of 2 N hydrochloric acid. An exothermic reaction was noticed. The temperature of the system was maintained at 75° to 77° C. for about four hours. The reaction mixture was allowed to cool to room temperature and then it was cooled with a salt-ice bath in order to crystallize the product. The product was isolated by filtration and identified as N-octyl-N-sorbitylurea.

Example 2

A mixture of 349 parts of N-dodecylglucamine, 90 parts of potassium cyanate, and 350 parts of water was added to a reaction vessel and heated gradually to 40° to 42° C. There was then slowly added 265 parts of 2 N hydrochloric acid causing an exothermic reaction to occur. The temperature of the system was maintained at 60° to 65° C. for three and a half hours. The reaction mixture was allowed to cool to room temperature and was then further cooled with an ice bath. The product was separated from the water layer and identified as N-dodecyl-N-sorbitylurea.

In a like manner, using phosphoric acid in place of hydrochloric acid and employing N-decylglucamine as a reactant, there was produced N-decyl-N-sorbitylurea.

Example 3

There was added together 377 parts of N-tetradecylglucamine, 75 parts of sodium cyanate, and 350 parts of water. The mixture was heated until a solution formed and then there was introduced 270 parts of 2 N hydrochloric acid. The reaction system was then maintained at reflux for three hours after which time the system was allowed to cool to room temperature. Crystallization of product was accelerated by use of an ice bath. The product was removed by filtration and identified as N-tetradecyl-N-sorbitylurea.

I claim:
1. As compositions of matter, N-alkyl-N-sorbitylurea, in which the alkyl group contains eight to fourteen carbon atoms.
2. As a composition of matter, N-octyl-N-sorbitylurea.
3. As a composition of matter, N-decyl-N-sorbitylurea.
4. As a composition of matter, N-dodecyl-N-sorbitylurea.
5. As a composition of matter, N-tetradecyl-N-sorbitylurea.

References Cited in the file of this patent
UNITED STATES PATENTS

| | | |
|---|---|---|
| 2,139,697 | Salzberg | Dec. 13, 1938 |
| 2,663,729 | Searle | Dec. 22, 1953 |
| 2,789,976 | Zech | Apr. 23, 1957 |